(12) United States Patent
Søgaard

(10) Patent No.: US 9,707,506 B2
(45) Date of Patent: Jul. 18, 2017

(54) WET-SCRUBBER FOR CLEANING OF POLLUTED GAS SUCH AS FLUE GAS

(71) Applicant: PureteQ A/S, Svendborg (DK)

(72) Inventor: Dennis Søgaard, Struer (DK)

(73) Assignee: PureteQ A/S (DK)

( * ) Notice: Subject to any disclaimer, the term of this patent is extended or adjusted under 35 U.S.C. 154(b) by 470 days.

(21) Appl. No.: 14/370,169

(22) PCT Filed: Jan. 17, 2013

(86) PCT No.: PCT/EP2013/050834
§ 371 (c)(1),
(2) Date: Jul. 1, 2014

(87) PCT Pub. No.: WO2013/107816
PCT Pub. Date: Jul. 25, 2013

(65) Prior Publication Data
US 2014/0338532 A1   Nov. 20, 2014

(30) Foreign Application Priority Data
Jan. 17, 2012   (EP) .................................... 12151372

(51) Int. Cl.
*B01D 47/06* (2006.01)
*B01D 47/02* (2006.01)
(Continued)

(52) U.S. Cl.
CPC .......... *B01D 47/06* (2013.01); *B01D 47/027* (2013.01); *B01D 53/18* (2013.01); *B01D 53/79* (2013.01); *B01D 2259/4566* (2013.01)

(58) Field of Classification Search
None
See application file for complete search history.

(56) References Cited

U.S. PATENT DOCUMENTS 2,940,733 A   6/1960   Umbricht
3,800,513 A   4/1974   Lappin et al.
(Continued)

FOREIGN PATENT DOCUMENTS

GB   234 109   1/1926
JP   2000210533 A   8/2000

OTHER PUBLICATIONS

International Search Report for Application No. PCT/EP2013/050834 dated Apr. 26, 2013.
(Continued)

*Primary Examiner* — Amber R Orlando
*Assistant Examiner* — Phillip Shao
(74) *Attorney, Agent, or Firm* — Lerner, David, Littenberg, Krumholz & Mentlik, LLP

(57) ABSTRACT

Wet-scrubber for cleaning flue gas, said wet scrubber comprising. The wet scrubber comprises a first end and a second end. Furthermore, it comprises an annular wall extending between the first end and the second end so as to form a chamber having a longitudinal axis, said annular wall and said ends having an inner surface and an outer surface, where said chamber comprises an inlet opening and an outlet opening, said openings being in fluid communication and defining a downstream direction from the inlet opening to the outlet opening. Furthermore, the wet-scrubber comprises a liquid distribution system comprising at least one liquid exit aperture for distributing a liquid film on the inner surface of the chamber. Finally, the wet-scrubber further comprises means arranged to rotate the liquid film on the inner surface of the annular wall relative to the annular wall.

14 Claims, 13 Drawing Sheets

(51) Int. Cl.
*B01D 53/18* (2006.01)
*B01D 53/79* (2006.01)

(56) References Cited

U.S. PATENT DOCUMENTS

| | | | | |
|---|---|---|---|---|
| 4,744,958 A | * | 5/1988 | Pircon | B01D 45/08 |
| | | | | 261/116 |
| 5,648,048 A | * | 7/1997 | Kuroda | B01D 53/504 |
| | | | | 422/168 |
| 6,017,384 A | * | 1/2000 | Risse | B01D 53/185 |
| | | | | 261/116 |
| 7,976,809 B2 | * | 7/2011 | Anttila | B01D 53/504 |
| | | | | 422/168 |
| 2002/0110511 A1 | * | 8/2002 | Klingspor | B01D 53/18 |
| | | | | 423/243.08 |
| 2008/0174032 A1 | | 7/2008 | Murata et al. | |

OTHER PUBLICATIONS

International Written Opinion for Application No. PCT/EP2013/050834 dated Apr. 26, 2013.

* cited by examiner

WET-SCRUBBER FOR CLEANING OF POLLUTED GAS SUCH AS FLUE GAS

TECHNICAL FIELD

The present invention relates to a wet-scrubber for cleaning flue gas, said wet scrubber comprising: A first end and a second end. An annular wall extends between the first end and the second end so as to form a chamber having a longitudinal axis. Said annular wall and said ends have an inner surface and an outer surface. The chamber of the wet-scrubber comprises an inlet opening and an outlet opening. The openings are in fluid communication and define a downstream direction from the inlet opening to the outlet opening. A liquid distribution system comprises at least one liquid outlet for distributing a liquid film on the inner surface of the chamber. The wet-scrubber further comprises means arranged to rotate the liquid film on the inner surface of the annular wall relative to the annular wall.

BACKGROUND

Wet-scrubbers are widely used for cleaning various substances from polluted gas, e.g. flue gas. In a wet scrubber, the polluted gas stream is brought into contact with the scrubbing liquid by spraying it with the liquid and by forcing it into contact with a pool of liquid, in general by creating an environment, where the liquid and the polluted gas are in contact so as to remove the pollutants.

Typically, known wet-scrubbers rely on gravity in order for the liquid to pass through the scrubber chamber. Typically, a liquid mist is ejected and caused to move along the longitudinal axis of the wet-scrubber due to the gravity. The gas is caused to move upstream of the direction of the emission of said liquid mist. Such scrubbers are often referred to as having a counter current flow.

Often, the gas, e.g. flue gas, is highly aggressive to the metal used to form the scrubber chamber. Hence, the chamber needs to be arranged in such way that the gravitational flow of liquid is covering the walls of the scrubber in the areas with flow of gas.

The flue gas or flue smoke may refer to the combustion gas produced at power plants.

Other materials such as plastics or synthetic materials may be used to form the chamber in order for the scrubber to withstand the corrosion. However, these materials have various drawbacks compared to the commonly used and easily accessible stainless steel. Such drawbacks could e.g. be less resistance to temperature, high weight, cost etc.

Furthermore, the orientation of known wet-scrubbers are fixed in their way of use in such way that a scrubber chamber designed to function and designed to function in a certain orientation may not be oriented in a different manner during use at the end location.

Hence, there is a need for a wet-scrubber substantially indifferent to the orientation of the chamber.

DISCLOSURE OF THE INVENTION

It is an aspect of the invention to provide a wet-scrubber causing rotation or in other ways, a non-straight flow of the flue gas without the use of guide vanes or similar physical guide means.

It is a further aspect of the invention to provide a wet-scrubber in which the velocity of the flue gas in the chamber along the longitudinal axis of the chamber is substantially independent from the path of the flue gas in other directions, i.e. radial or rotational.

This is achieved by a wet-scrubber for cleaning flue gas, said wet scrubber comprising:
- a first end comprising a first end wall and a second end comprising a second end wall;
- an annular wall extending between the first end and the second end so as to form a chamber having a longitudinal axis, said annular wall and said end walls having an inner surface and an outer surface;
- said chamber comprising a gas inlet opening and gas outlet opening, said openings being in fluid communication and defining a downstream direction from the inlet opening to the outlet opening;
- a liquid distribution system comprising at least one liquid outlet for distributing a liquid film on the inner surface of the chamber;

wherein the wet-scrubber further comprises means arranged to rotate the liquid film on the inner surface of the annular wall relative annular wall, and a liquid exit aperture arranged in a wall of the chamber, wherein the gas outlet opening is separated from the liquid exit aperture.

In this way, it is achieved that the chamber is protected from the harsh environment caused by the flue gas. The rotation of the film along the inner surface of the chamber ensures that an even distribution of the liquid is achieved, e.g. that the distribution of liquid on the inner surface is equalised to a more uniform thickness. The rotation of the liquid film is relative to the inner surface of the chamber and has the centre axis of rotation substantially coincident with the centre longitudinal axis of the chamber. The flue gas is reacting with the liquid and eventually causes the liquid to be contaminated. Hence, when rotating the liquid film, it is achieved that the gas is substantially evenly reacted/mixed with the liquid throughout the full length of the chamber, whereby it is possible to use a minimal amount of liquid resulting in fresh liquid being mixed with liquid already introduced with gas. Liquid exit points may be positioned along the length of the wet-scrubber in order to be able to feed an amount of liquid into the wet-scrubber, said liquid only reaching a certain degree of contamination before taken out of the wet-scrubber. If the gas to be cleaned is very contaminated with unwanted substances, it may be necessary to have a larger flow of liquid through the wet-scrubber. Guide vanes are prone to clog up and hence causing the wet-scrubber to be taken out of use for a period while cleaning it. It is important to mention that a cleaning process is not a matter of simply spraying with dissolvent or similar, e.g. using a high-pressure cleaner, but may be a very time-consuming and difficult task necessitating skilled people to work inside the wet-scrubber.

In an embodiment of the invention, the liquid distribution system may comprise a number of spray nozzles for emitting the liquid. In this way, it is achieved that the liquid is distributed evenly and furthermore, it is ensured that all the inner surface of the chamber is covered by liquid. The liquid mist emitted from the spray nozzles may be cone-shaped. Furthermore, the shape of the liquid emitted from the nozzles may be triangular seen in a first direction and relatively thin seen perpendicular to the first direction, i.e. forming a triangular wall. The liquid emitted by the nozzles may be rotating relative to the nozzle/chamber. The spray nozzles are in fluid communication with the extension tubes of the system.

In an embodiment of the invention, the liquid outlets may cause the liquid on the inner surface of the chamber to rotate in relation to the inner surface. When the liquid outlets, e.g.

pressurised spray nozzles, discharge the jet of liquid, said jet causes the liquid film to rotate. Hence, it is achieved that no other means is necessary for rotating the liquid film. Furthermore, in this way, a more even distribution of the liquid on the inner surface of the chamber can be achieved.

In an embodiment of the invention, the liquid distribution system may comprise a number of extension tubes comprising:
a first end in fluid communication with the central liquid conduit,
a second end arranged for emitting liquid, said first end and second end being in fluid communication.

In an embodiment of the invention, the rotating liquid film may be moving downstream relative to the inner surface of the chamber. In this way, it is achieved to introduce a pressure in the wet-scrubber, said pressure having a positive impact on the flow through the chamber, i.e. forcing more gas through the chamber. In an embodiment of the invention the rotating liquid film may be moving upstream relative to the inner surface of the chamber. In this way, the liquid film is generating a counter-pressure to the gas entering the chamber.

In an embodiment of the invention, the wall of the chamber may comprise at least one liquid exit aperture. In this way, it is possible to draw the contaminated liquid from the chamber to a location outside the chamber, e.g. for further treatment. The liquid is contaminated with the substances from the flue gas desired to be removed.

In an embodiment of the invention, the second end of the extension tubes may comprise a tube outlet, where the axis of the tube outlet is arranged so as to point towards the inner wall of the chamber in a downstream angle.

In an embodiment of the invention, the inner wall of the chamber may comprise a polygonal cross section seen perpendicular to the longitudinal axis. In this way, it is possible to use different ways of manufacturing the chamber, e.g. using plane sections to create the chamber instead of curved sections.

In an embodiment of the invention, the spray nozzles may be positioned along the centre longitudinal axis of the chamber. In this way, it is achieved that the inner surface of the chamber is kept smooth with no obstacles for the liquid film to pass. The spray nozzles may be arranged in retracted cavities in the annular chamber wall.

In an embodiment of the invention, the spray nozzles may form a cone of liquid. In this way, it is possible to guide the flue gas inside the chamber. It is easier for the flue gas to pass the sectional area where no cone is present, but this area is not large enough for all the flue gas to pass through. Hence, the flue gas passes both around the cone and through the liquid cone. By this, it is possible to achieve that at least part of the flue gas, seen in a cross sectional view of the chamber, is forced through the cone. The distribution of the liquid cones along the longitudinal axis of the chamber facilitates that the flue gas is conducted in a spiral or helix path. Thereby, it is achieved that different flue gas is forced through a cone at different locations along the longitudinal axis of the chamber. Thereby it is achieved that the flue gas is efficiently mixed with the liquid. Hence, the path of the flue gas serves to force the flue gas and the liquid into contact.

In an embodiment of the invention, the chamber and hence the longitudinal axis of the chamber may be substantially horizontally oriented. In this way, it is possible to mount the wet-scrubber in areas with limited height or in places where high structures would be problematic, e.g. on vessels/ships. Furthermore, a wet-scrubber mounted horizontally on a roof of an industrial building is typically a much simpler task than installing a scrubber tower, e.g. due to the force applied by the wind.

In an embodiment of the invention, the chamber and hence the longitudinal axis of the chamber may be formed in an angle, e.g. L-shaped. In this way, the wet-scrubber is easy to fit into places with limited space, e.g. on board a ship where both height and free surface area may be hard to find. Hence, it is possible to use a space in a corner of a rectangular surface area. Forming the chamber in an angle is made possible due to the fact that the liquid is distributed in the chamber by the liquid outlets, and in this way the inner surface of the chamber is fully covered with liquid despite the orientation and shape of the chamber.

In an embodiment of the invention, the chamber and hence the longitudinal axis of the chamber may be formed in a curvature, e.g. C-shaped. In an embodiment of the invention, the chamber may be formed by a number of straight sections combined via or with a number of curved sections. In this way, it is possible to fit a large chamber volume into a small space. This is e.g. a situation occurring when adding or refitting a wet-scrubber to the exhaust system of a ship or vessel.

In an embodiment of the invention, the liquid covering the inner surface of the chamber may be rotating. In this way, it is achieved that the distribution of liquid on the inner surface is equalised to a more uniform thickness. Furthermore, it is achieved that fresh liquid is mixed with liquid already introduced with gas.

In an embodiment of the invention, the liquid may be water. The water is easy to handle and reacts well with the flue gas. In another embodiment, the liquid used in the wet-scrubber may be either fresh water or salt water. Additives e.g. calcium hydroxide ($Ca(OH)_2$) or soda lye (NaOH) may be added. In this way, the liquid may be adapted to the specific substances to be cleaned in the flue gas.

In an embodiment of the invention, the liquid distribution system may comprise a liquid outlet arranged in the inlet opening of the chamber. In this way, it is achieved that even the very first section of the chamber is covered with liquid. Thereby, it is possible to distribute the gas in the full length of the chamber. Furthermore, positioning a liquid outlet in the position supports a quench process in the first section of the chamber.

In an embodiment of the invention, the chamber may be made of stainless steel. When using stainless steel for the chamber, it is possible to have high gas temperatures if such are desired.

In an embodiment of the invention, the liquid distribution system may comprise a substantially centrally arranged conduit in fluid communication with the nozzles inside the chamber and a liquid supply. Having a centrally arranged liquid conduit supplying liquid to all of the nozzles minimises the installation and maintenance costs. In a further embodiment of the invention, the mounting of the extension tubes and thereby the liquid outlets, e.g. nozzles in the chamber, may be retracted to a concave area extending radially outwardly from the inner surface of the wall. In this way, the liquid outlet and the nozzle are protected from the flue gas. The extension tubes may be connected to a liquid distribution system or may be connected by individual tubes to a liquid supply or may be connected to a common liquid distribution conduit, e.g. arranged along the longitudinal axis of the wet-scrubber.

In an embodiment of the invention, the liquid distributed in the chamber of the wet-scrubber is let out of the chamber via liquid exit apertures in the annular wall of the chamber.

In this way, gravity easily forces the liquid out of the chamber when the longitudinal axis of the chamber is in horizontal position.

In an embodiment of the invention, the end wall of the chamber may comprise at least one liquid exit aperture.

In this way, the separation of liquid and gas is particularly easy if the longitudinal axis of the chamber is arranged in a position different from the horizontal position.

The liquid exit apertures may comprise valves for controlling the amount of liquid drained from the chamber.

If no liquid cones were present in the chamber, the gas would simply fill the chamber after entering the chamber and then exit the chamber substantially without turbulence.

However, when the liquid cones are present, they result in an obstruction of the gas so that the gas tries to avoid moving around. Hence, due to the presence of the liquid cones, the gas will have an alternating path along the longitudinal axis that changes according to the position of the liquid cones.

The nozzles of the liquid distribution system may have an opening of 1.5-4 mm, or 2-3.5 mm or 2.5-3 mm. The pressure in the nozzle may be 1-5 bar resulting in a liquid capacity of 5.5 to 9 liters per minute. The velocity of the liquid passing the nozzle may be 1-3 meters per second.

During tests, a particular embodiment has been found to function well according to the following settings:
  The aperture of each nozzle being 2.8 mm in diameter,
  A pressure of 3 bars
  A liquid capacity of 7.4 L/min
  A liquid velocity of 2.0 m/sec
  Orientation of nozzle −10° to +10° (upstream to downstream)
  Diameter of chamber approximately 2,000 mm When using these settings, the liquid film is evenly formed in a chamber having a diameter of 2,000 mm, and the longitudinal axis of the chamber may be arranged in any angle. The orientation of the nozzles is typically 0° whereby the wet-scrubber is pressure neutral. However, by turning the nozzles, giving them a direction either upstream or downstream it is possible to influence the flow through the chamber i.e. create a counter pressure or a concurrent pressure.

The chamber may be of diameter from 600 mm to 4.000 mm. Obviously, when changing the diameter adjusting of the above mentioned parameters is necessary.

The hydrodynamic channel formed by the liquid cones provides a path for the gas. The outer perimeter of the path is delimited by the annular wall, and the liquid cones serve to create obstructions forcing the gas to change direction seen perpendicular to the longitudinal axis of the camber. Furthermore, the velocity of the liquid of the liquid cones emitted by the nozzles causes the liquid film on the inner surface of the chamber, i.e. the inner surface of the annular wall, to rotate.

When the liquid cones cause the liquid film on the inner surface of the chamber to rotate, said film is released from depending on gravity in order to move relative to the inner surface of the chamber. This effect is present both in respect to movement along the longitudinal axis of the chamber as well as to angular movement of the liquid, i.e. movement along the inner surface in a plane perpendicular to the central axis.

When the liquid film is caused to move independently of the gravity, the orientation of the chamber is irrelevant for achieving the desired effect, i.e. the movement of liquid relative to the wall. Hence, a full liquid coverage of the internal surfaces of the chamber is achieved.

Thus, it is possible for the wet-scrubber to comprise e.g. two sections, where the two sections are arranged in an angle of e.g. 90°. Similarly, it is possible to have multiple sections arranged in multiple angles to each other but still being in fluid communication. Such arrangement of multiple sections but still obtaining a full liquid coverage of the entire inner surface is necessary e.g. when adapting the wet-scrubber to existing vessels. Due to new requirements, large vessels are deemed to have scrubbers fitted on their exhaust system.

In another embodiment, a number of chambers each having their inner surface covered with liquid may be in fluid communication with each other via tubes of various material.

Such various material may be material withstanding the harsh nature of the gas such as a highly corrosion or acid resistant material.

In a further embodiment, the chamber may comprise a gas inlet in the annular wall.

In this way, a wet-scrubber comprising a joint chamber section for a number of branching chamber sections is achieved. This may be considered a manifold part of the wet-scrubber. Such manifold part of the wet-scrubber may comprise a quench section or heat exchanging means. In this way, it is possible to harvest the energy stored in the hot gas.

Such harvesting of heat is of major importance for the total profit of the wet-scrubber when used in e.g. a power plant. The power plant is capable of utilising the energy directly in the process of producing e.g. heat or electricity to a grid.

In an embodiment, the heat exchanging means may be in the shape of a spiral. The spiral may be located along the inner sider of the annular wall. Due to the rotation of the liquid on the inside of the walls, a disturbance in the gas flow in the chamber is not causing any problems concerning the full coverage of the inner surface of the annular wall with liquid. The heat exchanging means may be made of corrosion resistant material e.g PE, PP, Silicone or Teflon i.e. a material that is resistant to acid.

The heat exchanging means may be located in any part of the wet-scrubber. The heat exchanging means may contain a liquid in order to transport the heat from the chamber to the outside of the chamber. In an embodiment, the heat exchanging means may be integrated into the annular wall of the chamber. In this way, it is possible to achieve an even and smooth surface. In a further embodiment, the heat exchanging means may be radially distanced from the inner surface of the chamber towards the centre of the chamber.

Furthermore, the invention relates to a method of cleaning flue gas, the method comprising the steps:
  providing a wet-scrubber,
  injecting liquid through the liquid distribution system so as to form a liquid film on the inner surface of the chamber,
  causing the liquid film to rotate relative to the inner surface,
  injecting contaminated gas to be cleaned through the inlet opening,
  forcing the gas into contact with the liquid, and
  emitting the cleaned gas from the exit opening of the chamber.

In an embodiment of the invention the method may further comprise the steps:
  spraying liquid into the chamber in a manner so as to partly block linear path for the gas in the chamber,
  causing the gas to follow a spiral path and/or a wiggling path In another embodiment of the method the method may further comprise the step:

Retrieving liquid from the chamber in dedicated exit apertures separated from the gas outlet of the chamber.

Furthermore, the invention relates to use of a wet-scrubber according to the invention for cleaning flue gas. In this way, it is achieved that the flue gas is purified of a number of environmentally hazardous particles and substances.

The invention further relates to a ship comprising a wet-scrubber wherein the longitudinal axis of at least one chamber of the wet-scrubber according is horizontally positioned.

In this way it is possible to fit the wet-scrubber into tight spaces. This is particularly necessary when refitting the exhaust system of an existing ship with the wet-scrubber e.g. in order to meet new environmental demands. Large ship or vessels may seem to have free space outside the actual structure of the ship but a wet-scrubber for a large ship may need to have a 10-30 meter long chamber, said chamber having a diameter of 1.5 meter to 4 meters. Hence, it is a large structure to fit onto even a large ship. Furthermore, if such structure itself should be able to resist the outdoor tear and wear at open sea it needs to be constructed in a very expensive manner using thick steel plates specially maritime adapted paint etc.. Hence, a wet-scrubber that is able to be fitted on the interior side of the protective hull of the ship or in general at a location on the ship protected from the harsh environment at sea will be highly advantageous.

BRIEF DESCRIPTION OF THE DRAWING(S)

The present invention will now be discussed in more details with reference to the drawings in which.

Figure 2:
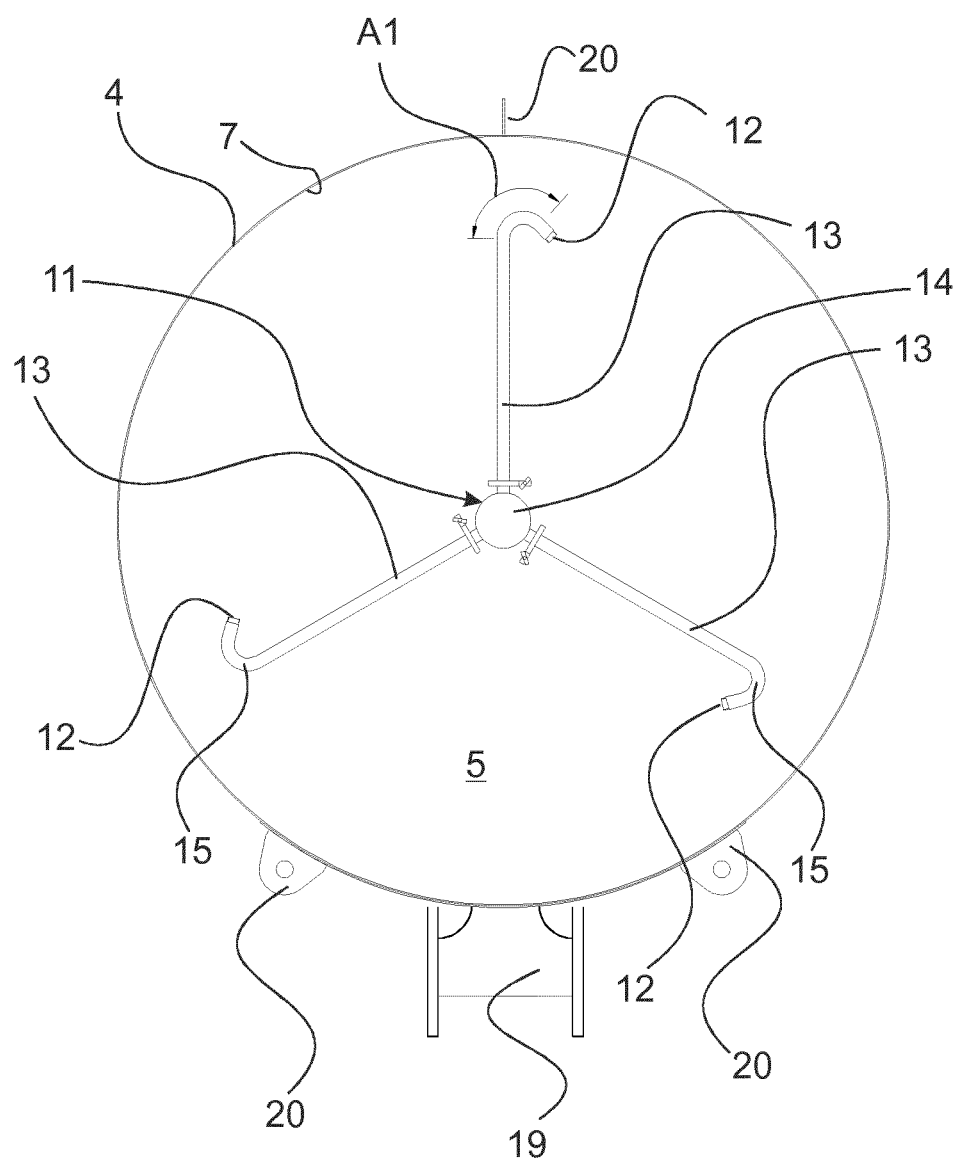
FIG. 2 shows a cross-sectional view of the wet-scrubber of FIG. 1.
Figure 3A:
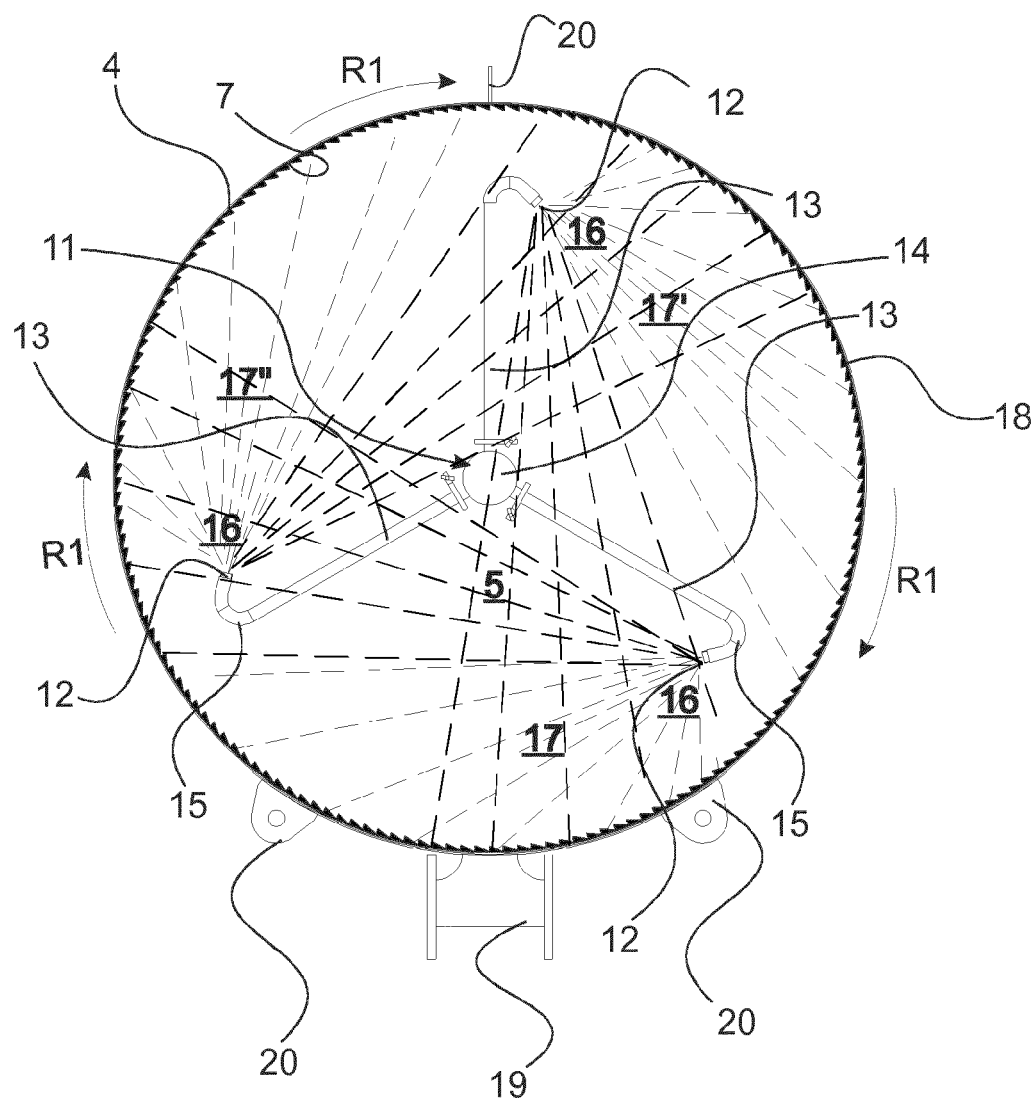
Figure 3B:
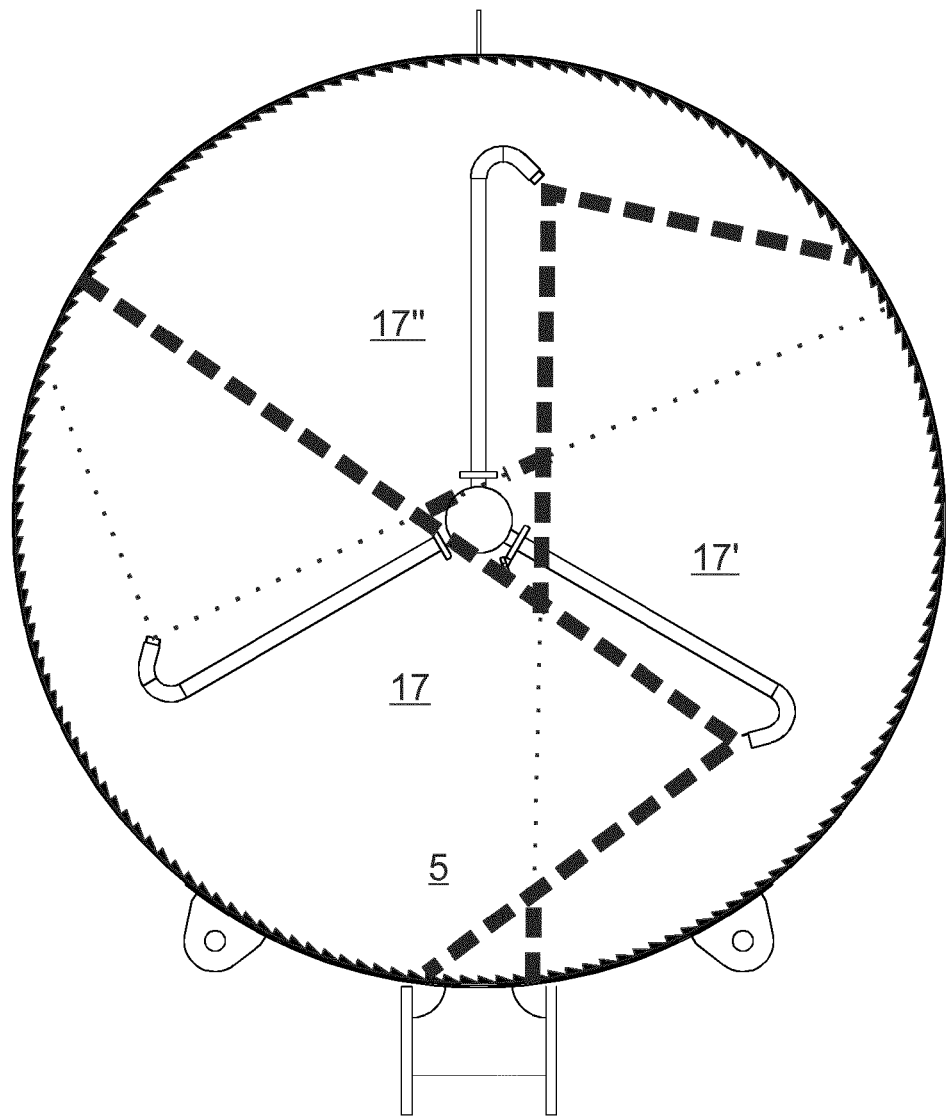
Figure 3E:
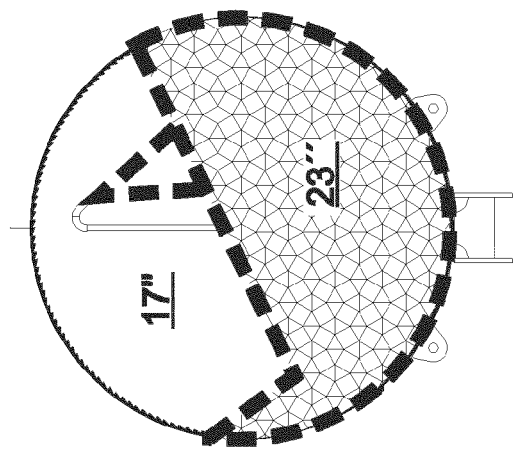
Figure 3D:
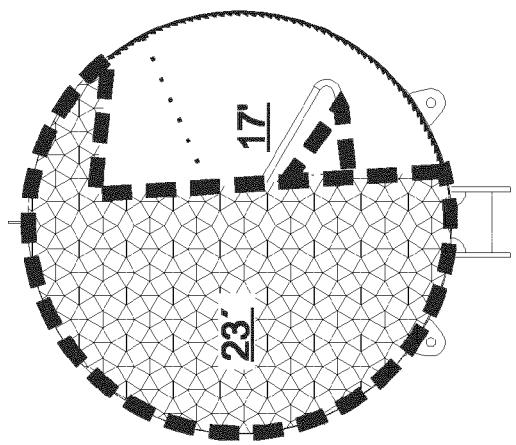
Figure 3C:
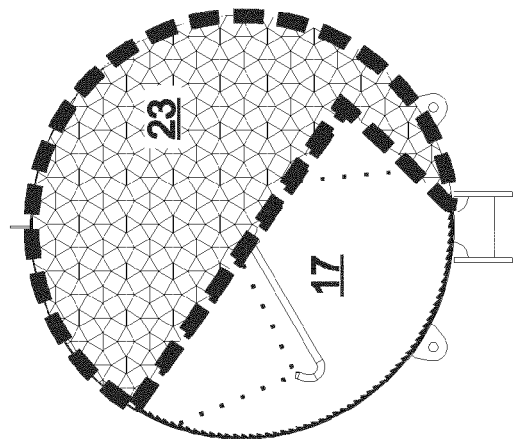
Figure 4:
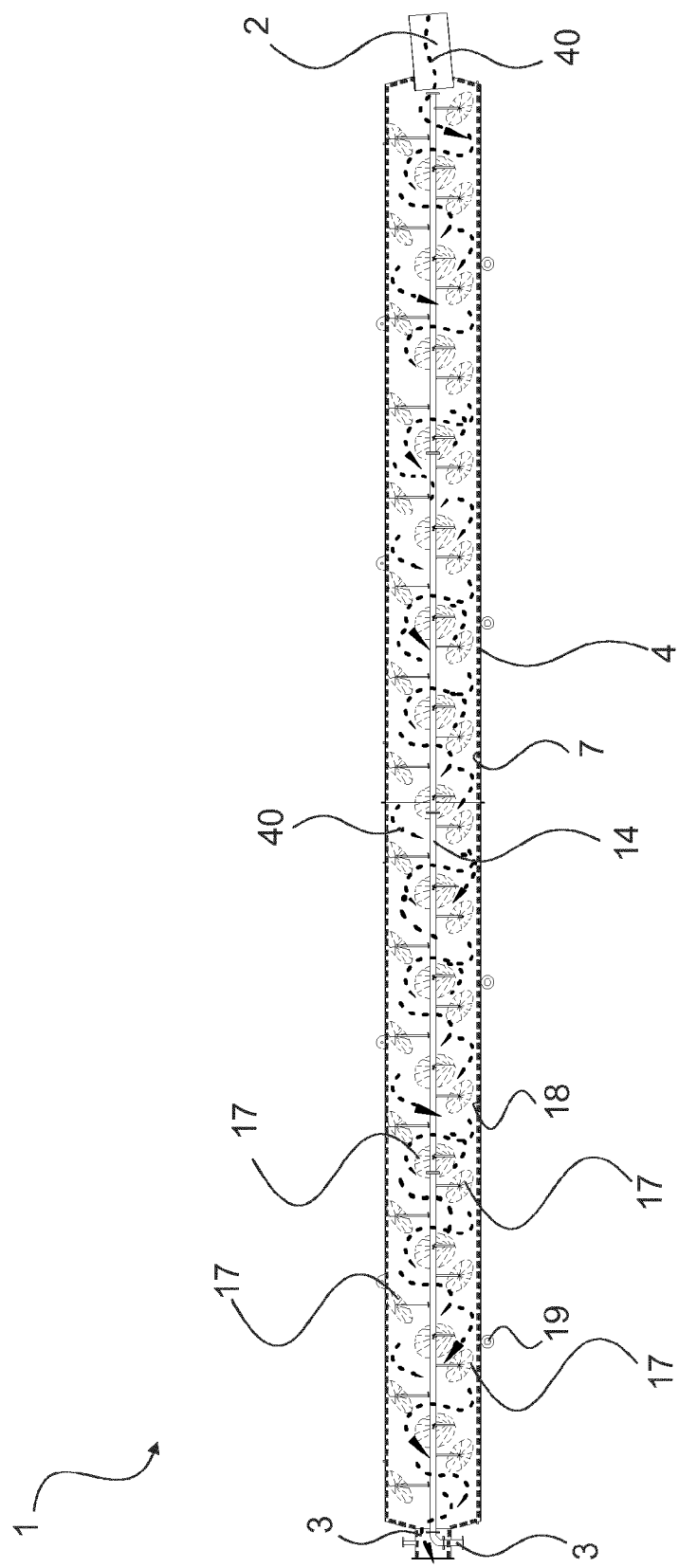
Figure 5:
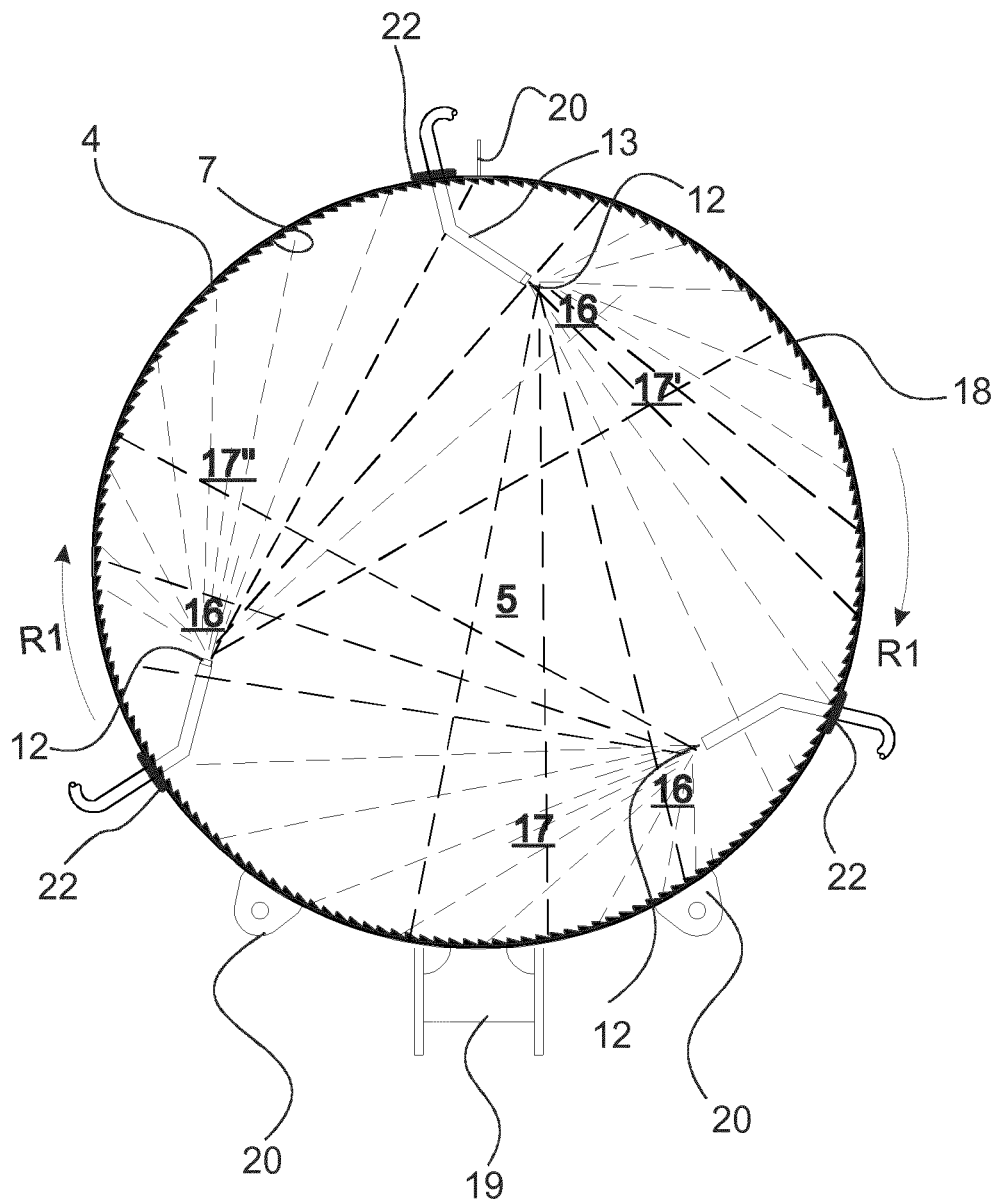
Figure 6:
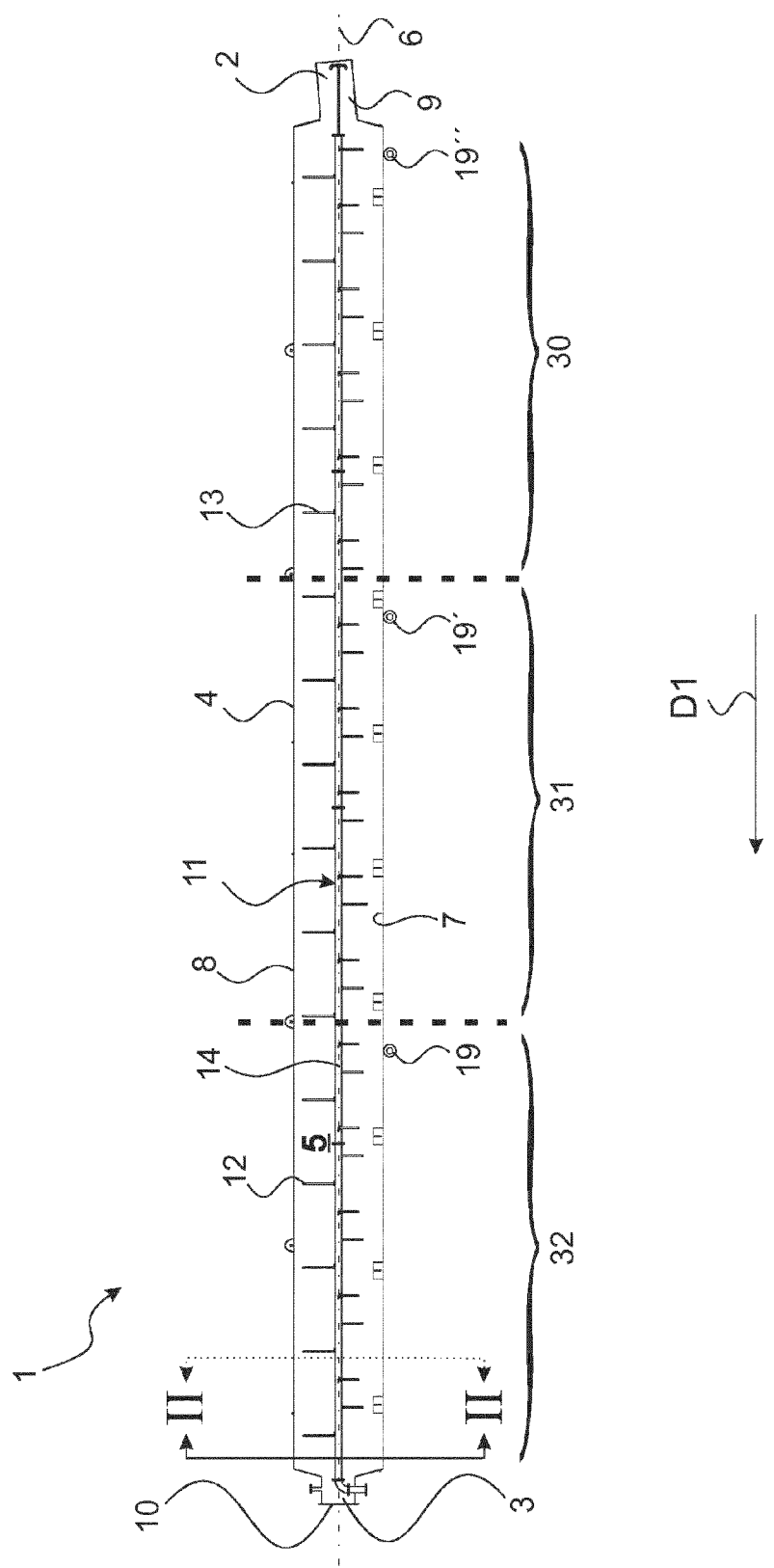
Figure 7A:
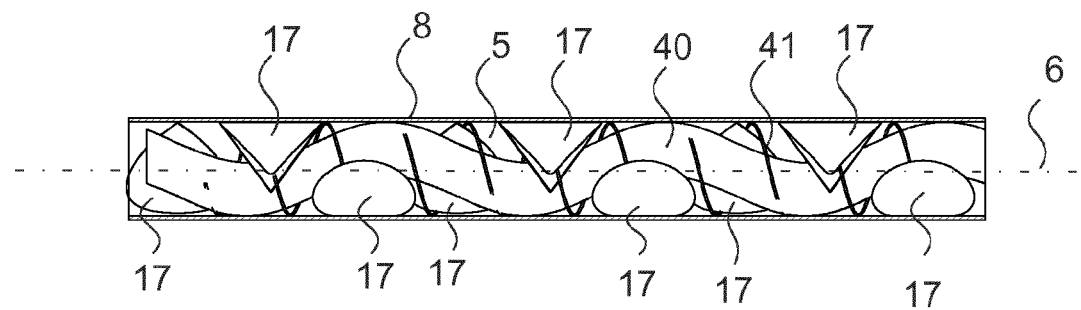
Figure 7C:
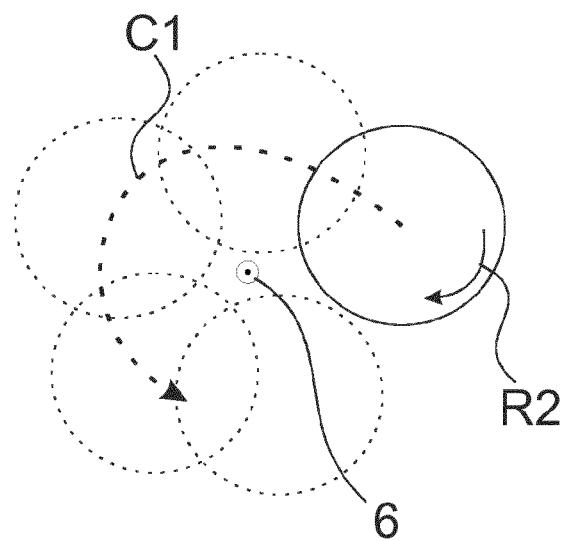
Figure 7B:
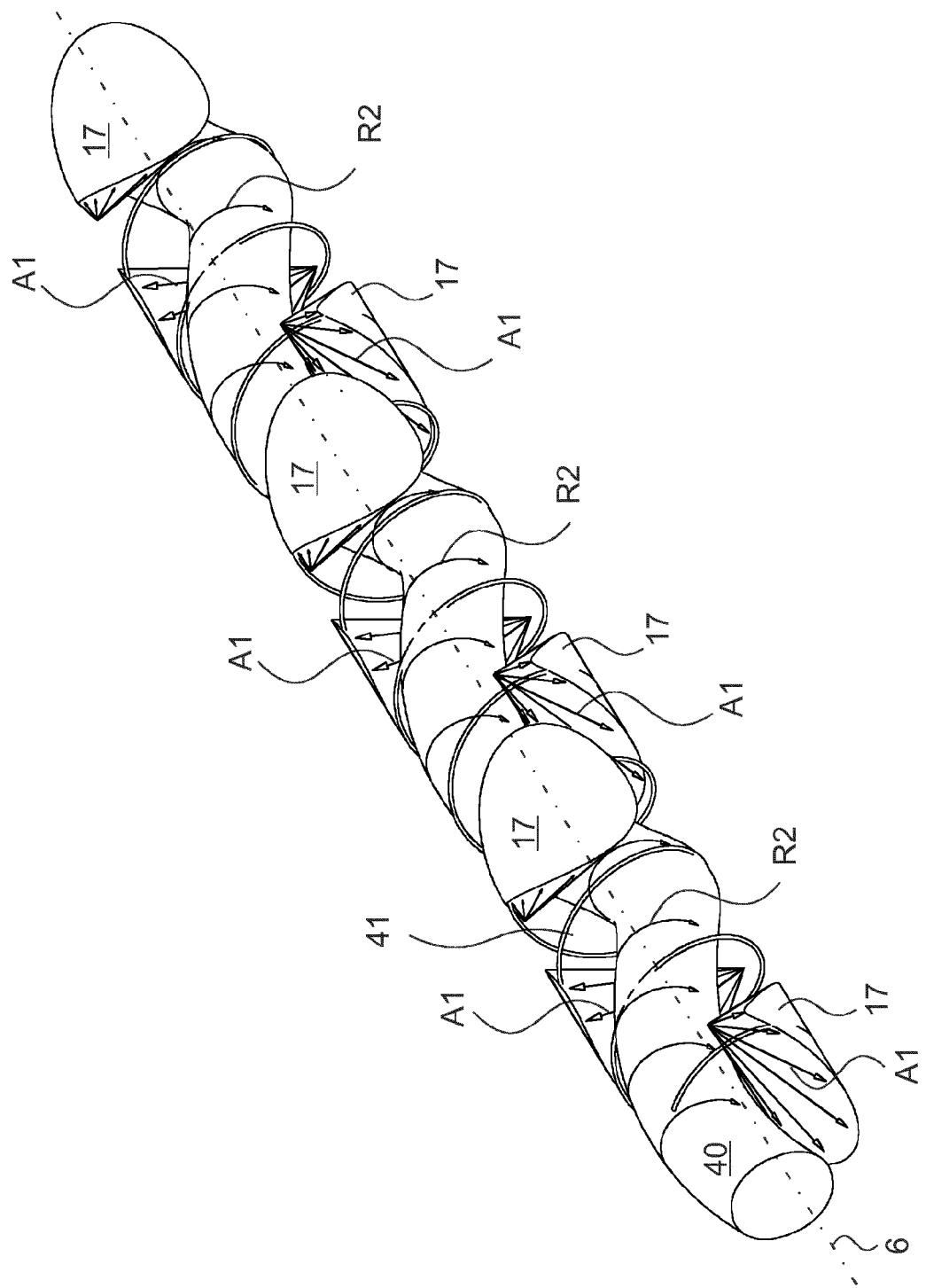
Figure 8A:
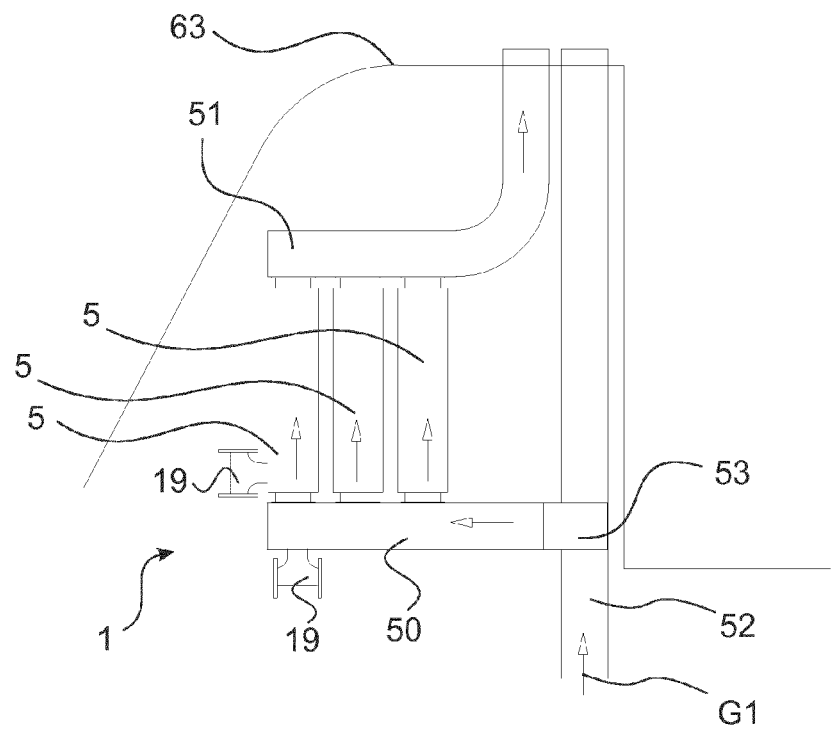
Figure 8B:
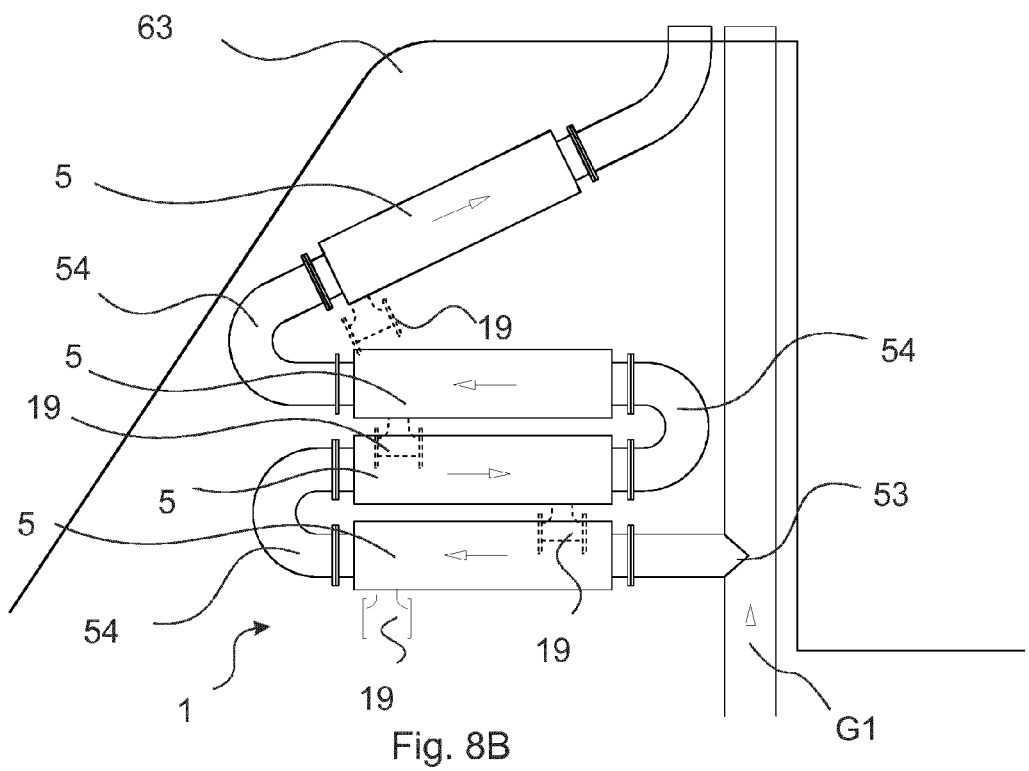
Figure 9:
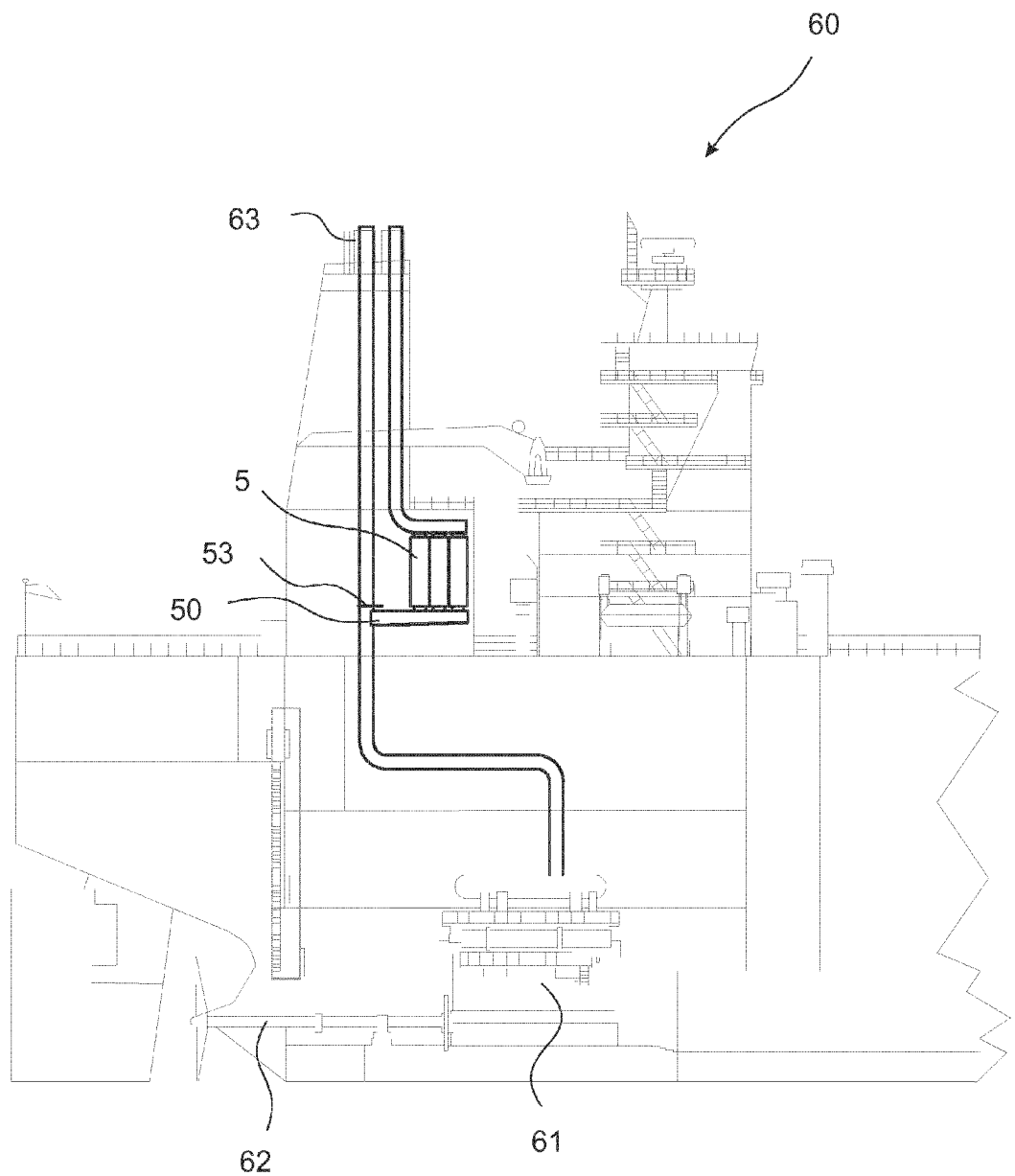
Figure 10:
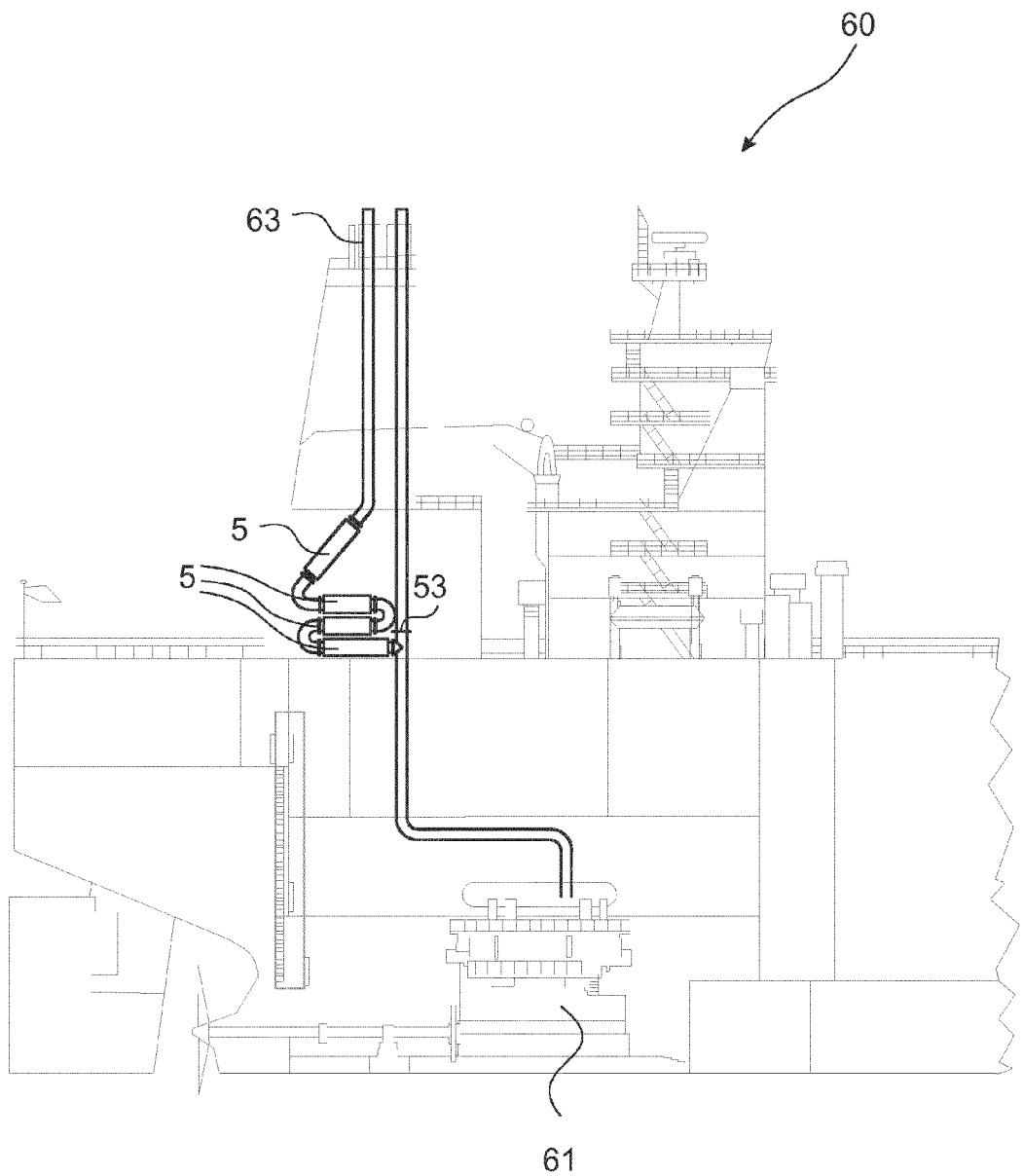

FIGS. 3A-E show a cross-sectional view of the wet-scrubber similar to that of FIG. 2 though indicating the distribution of liquid in the chamber, FIG. 4 shows an example of the gas path through the chamber, FIG. 5 shows an embodiment of the liquid distribution system, FIG. 6 partly shows a further embodiment of the system shown in FIG. 5, FIGS. 7A-7C show another depiction of path of gas along the longitudinal axis of the chamber, FIG. 8A shows an embodiment of the wet-scrubber comprising a quench section and chambers arranged in an angle relative to each other, FIG. 8B shows an embodiment of the wet-scrubber comprising a number of chambers arranged in an angle relative to each other connected by bend tube sections, FIG. 9 shows the embodiment of the wet-scrubber shown in FIG. 8A mounted on the exhaust of a large ship engine, and FIG. 10 shows the embodiment of the wet-scrubber shown in FIG. 8B mounted on the exhaust of a large ship engine.

DETAILED DESCRIPTION OF THE INVENTION

Figure 1:
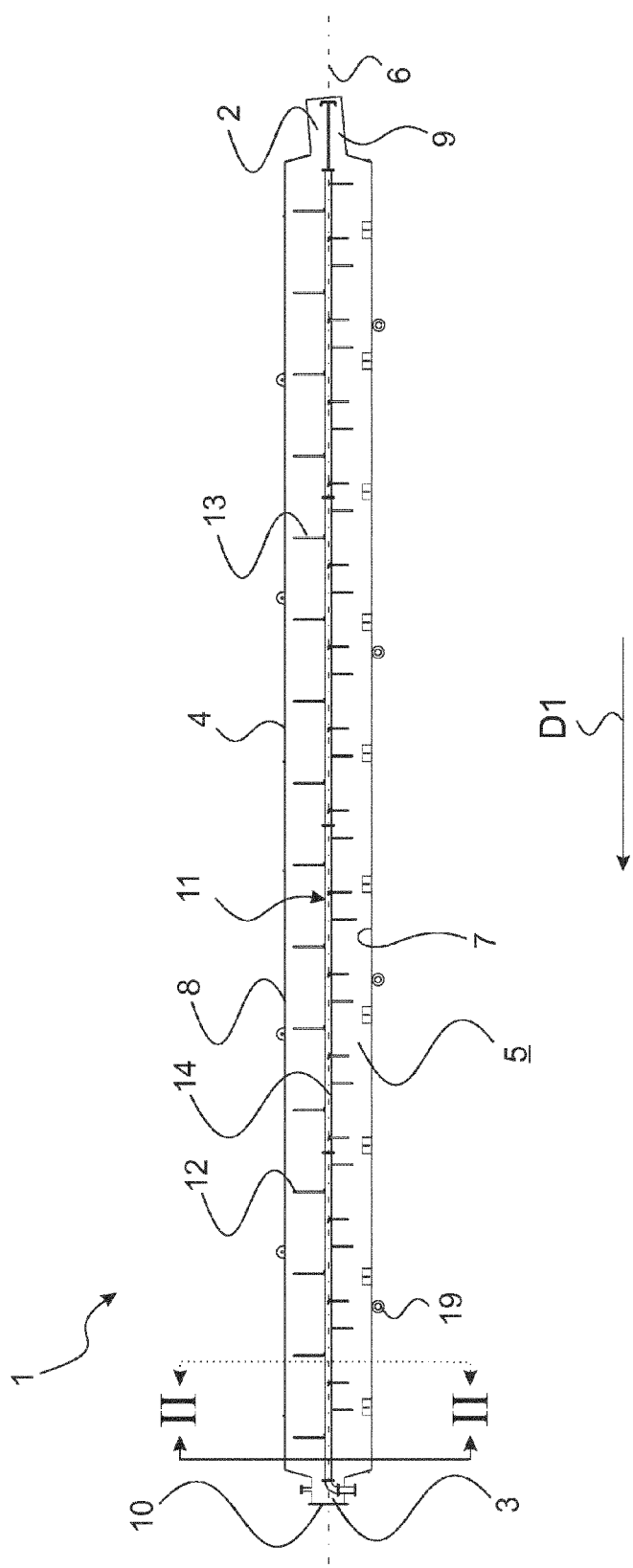
FIG. 1 shows an embodiment of the wet-scrubber according to the invention.

FIG. 1 shows a wet-scrubber 1, e.g. for cleaning flue gas, said wet-scrubber 1 comprising a first end 2 and a second end 3. An annular wall 4 extends between the first end 2 and the second end 3 so as to form a chamber 5 having a longitudinal axis 6. Said annular wall 4 and said ends 2, 3 have an inner surface 7 and an outer surface 8. The chamber 5 comprises an inlet opening 9 and an outlet opening 10. Said openings 9,10 are in fluid communication and define a downstream direction D1 from the inlet opening 9 to the outlet opening 10. A liquid distribution system 11 is shown comprising a number of liquid outlets 12 for distributing a liquid film 18 (not shown in FIG. 1, best seen in FIG. 3) on the inner surface 7 of the chamber 5. The liquid outlets 12 are arranged on extension tubes 13 in order to displace the liquid outlets 12 from the central liquid distribution conduit 14. The wet-scrubber 1 in FIG. 1 is shown in a horizontal arrangement. However, it is within the scope of the present invention that the wet-scrubber 1 may be oriented in various ways, e.g. vertically.

FIG. 2 shows a cross-sectional view of the wet-scrubber 1 of FIG. 1. No liquid is shown in this view. The extension tubes 13 comprise tube end sections 15. The tube end sections 15 are arranged at an angle of 135° in relation to the extension tube 13. The angle of the tube end sections 15 may be arranged differently, e.g. if the extension tube 13 is shorter that indicated in the present embodiment. Furthermore, the tube end sections 15 may be arranged at an angle in relation to the longitudinal axis 6 of the chamber 5/wet-scrubber 1, e.g. in a downstream direction (see D1 in FIG. 1). The direction of the liquid outlets 12 may be used to adjust a pressure in the wet-scrubber, i.e. if the liquid outlets are pointing in an upstream direction, they will supply a counter pressure, i.e. a negative pressure influence, to the gas inlet. In a similar manner, the gas is subjected to a positive pressure influence if the liquid outlets 12 are arranged in a downstream direction. If the liquid outlets 12 are arranged in a manner so as to point substantially at an angle perpendicular to the longitudinal axis 6 of the chamber 5, the wet-scrubber is considered pressure neutral in relation to the pressure of the gas.

In this embodiment, the cross-section of the chamber 5 is circular, i.e. the wall 4 is substantially circular along the longitudinal axis 6 of the chamber 5. In this embodiment, mounting brackets 20 are positioned on the wall 4. A liquid outlet 19 is positioned in the lowest point of the chamber 5 in order to be able to withdraw liquid from the chamber 5.

FIG. 3A shows a cross-sectional view of the wet-scrubber similar to that of FIG. 2 showing the liquid 16 sprayed into the chamber 5. It is seen that each liquid outlet 12 emits a cone 17, 17', 17" of liquid 16. This results in a liquid film 18 on the inner surface 7 of the wall 4 of the chamber 5. By the presence of the liquid film 18, it is achieved that the gas in the chamber 5 is not in contact with the inner surface 7 of the wall 4. Hence, the wall 4 is protected from the aggressive substances in the gas, i.e. substances that would cause the wall 4 to corrode or deteriorate.

Due to the liquid 16 and the pressure emitted from the liquid outlets 12, the liquid film 18 is caused to rotate relative to the inner surface 7 of the wall of the chamber 5. This rotation is indicated by the arrows R1. In this embodiment of the wet-scrubber, the liquid distribution system 11 does not rotate. The liquid film 18 is depicted as an even film, but due to the pressure from the liquid outlets 12, the liquid film will in practice only be substantially even. The liquid outlets 12 may be distributed along the longitudinal axis in a manner so that more liquid outlets 12 or pressure nozzles are arranged for forcing the liquid film upwards (in relation to the ground) than for forcing the liquid film downwards. In this way it is achieved that a wet-scrubber having a horizontal longitudinal axis 6, an even better distribution of the liquid along the inner surface 7 of the chamber 5.

FIG. 3B shows a cross-sectional view similar to that of FIG. 3A although the distribution of the liquid 16, i.e. the cones 17, 17', 17", is indicated in a different manner. FIG. 3B indicates how the cone 17 is positioned in front of cone 17', which is positioned in front of cone 17". This cross-sectional view only shows a small part of the liquid distribution system 11, i.e. only three liquid outlets 12. It is to be understood by e.g. FIG. 1 that the wet-scrubber 1 comprises a large number of liquid outlets 12. The gas (not shown) entering the chamber 5 passes only reluctantly directly through a cone of liquid 17, 17', 17". Hence, the gas will seek to pass around the cones 17, 17', 17". When following the path of the gas along the longitudinal axis 6 (not shown) of the chamber, the gas needs firstly to pass around the first cone 17 of liquid, secondly to pass around the second cone 17' and finally to pass around the third cone 17". These areas, which are passed the easiest by the gas, are shown in FIGS. 3C-3E, where FIG. 3C shows the area around the cone of liquid 17, which is passed the easiest by the gas. FIG. 3D shows the area around the second liquid cone 17', which is to be passed by the gas, and finally FIG. 3E shows the area around the third liquid cone 17" to be passed by the gas. Obviously, it is to be understood that the gas is a continuous flow. By way of the liquid cones 17, 17', 17", it is possible to guide the gas in a desired path inside the chamber 5. Said guiding of the gas serves to force the gas into contact with the liquid in order for the gas and the liquid to react. Furthermore, the cones ensure that most of the gas is guided through the chamber following a path that is longer than the actual length of the wet-scrubber. A number of spray nozzles are available, and nozzles emitting a cone of liquid are an embodiment of the invention. However, spray nozzles emitting a triangular-shaped wall of liquid may achieve the same effect of having the gas guided inside the chamber 5. The nozzles may also be rotating nozzles.

Because the path of the gas is completely surrounded by liquid, it is achieved that the contaminated gas has a larger contact surface with the liquid, which means that better cleaning of the gas is achieved. FIGS. 3A-E show that the extension tubes 13 are equidistantly placed around the central liquid conduit 11. However, they may also be positioned in a more random manner. Such random positioning may be followed by having different angles Al of the tube end section 15 in order to create an alternating gas path along the longitudinal axis 6. FIGS. 3C-E show the cross-sectional path area 23, 23', 23", which the flue gas is most likely to pass through in order to avoid the liquid cones 17, 17', 17". The views are sequential along the longitudinal axis 6 of the wet scrubber 1 (see FIG. 1). In FIG. 3C (and partly 3D) smaller parts of the liquid cones 17' and 17" are indicated with dotted lines because they might be seen through the liquid cone 17. However in practice, the flue gas will fill the space around the cones and also the space behind the liquid cones. These areas/volumes 23, 23', 23" constitute the area left around the liquid cones 17, 17', 17". Hence, the area left for the flue gas to pass easily around the liquid cones 17, 17', 17" is diminished if enlarging the cones 17, 17', 17". It is to be noted that the liquid cones 17, 17', 17" are less distinct than depicted in the Fig., i.e. the cones are rather to be considered as a mist of liquid and not a "wall" of liquid as such. The cones 17, 17', 17" act as chicanes thereby obstructing the path of the flue gas, whereby the flue gas is forced into contact with the cones 17, 17', 17". The path through the wet-scrubber 1 is balanced in a manner so that the flue gas is moving along a highly liquidised path with obstructions, but still without getting to a full halt. The width of the liquid cones 17, 17', 17" may be changed e.g. enlarged, such that the area 23, 23', 23" to be passed by the flue gas is diminished.

FIG. 4 shows a longitudinal cross sectional view of the wet-scrubber 1. A number of liquid cones 17 (the cones are all numbered 17 in the present Fig., i.e. not separately indicated by 17,17',17" . . . etc.) are emitted from the liquid outlets 12 in fluid communication with the liquid distribution system 11. Normally, the cones 17 overlap more than shown in the Fig., but for illustrative purposes, the liquid cones 17 are depicted as being separate from each other. It is seen that the inner surface 7 of the chamber is completely covered with liquid. Depicted just a few places reference sign 40 indicate the gas or gas tube 40 (this matter is shown in more detail in FIG. 7B).

FIG. 5 shows an embodiment of the wet-scrubber 1 where the liquid outlets 12 are mounted on extension tubes 13 in fluid communication with a liquid system (not shown) located outside the chamber 5. Such externally arranged liquid distribution system may either comprise separate tubes connected to each of the extension tubes 13 or a number of extension tubes 13 may be joined in a common liquid conduit. The extension tubes 13 are led through the wall of the chamber and a sealing means 22, e.g. a rubber disc or other sealing material resistant to the flue gas. By this arrangement of the extension tubes 13 and the sealing means 22, it is achieved that the liquid outlets 12 may be retracted during maintenance and e.g. exchanged and/or serviced without influencing the process of handling flue gas in the chamber 5. In case the wet-scrubber is mounted on continuously running equipment such as a power plant or a large vessel, it is important for both the environment as well as the cost efficiency of the equipment to avoid any shut-downs in the process.

FIG. 6 shows an embodiment of the wet-scrubber 1, where the chamber 5 of the wet-scrubber 1 is separated into longitudinal chamber sections 30, 31, 32, where each section is subjected to a liquid of different temperatures. The sectioning mainly concerns the liquid emitted in the different sections. However, a small projection may be located near the outlets 19, 19', 19" in order to guide the liquid used in the particular section out. Thereby, it is achieved that the liquid of each section is only slightly mixed. Furthermore, the change of liquid facilitates that the liquid in the second chamber is kept at a different temperature. It is to be understood that the sectioning of the chamber 5 into the sections 31, 31, 32 does not necessarily mean distinct areas of different temperatures or different liquids. This is due to the fact the entire surface of the chamber 5 needs to be covered with liquid at all times. The reference numerals are further discussed with respect to FIG. 1. This sectioning is e.g. an advantage in large energy facilities/power plants for district heating, where cold water returns from the users. By this process, the cold return water is preheated by heat exchanging with the liquid used, e.g. increased at each section, in order to cool down the flue gas. In this way, costs are saved for heating the water at the power plant because the water is already preheated before entering the actual heating part of the power plant. This means less energy consumption before sending the heated water back into the district heating grid. Typically, the flue gas from the power/energy plant entering the wet-scrubber 1 at the first end 2 is typically 150-250° C. and the flue gas being emitted from the second end 3 of the wet-scrubber is less than 100° C. When a sufficient amount of liquid is present, an adiabatic balance is obtained at 45° C.-75° C. or more preferred at 55°-65° C. at 1 atm. Separated chamber sections 30, 31, 32 are used in order get as much heat out of the flue gas as possible, i.e. ensuring that the initial flue gas entering the wet-scrubber, i.e. the flue gas having the highest temperature, is used for the return water with the highest temperature. The gas entering the chamber 5 may be subjected to quenching in order to cool the gas.

FIGS. 7A and 7B show a schematic view of the gas flow in a straight embodiment of the wet-scrubber 1. A part of the annular wall of the chamber 5 is removed—the part facing the reader—in order to see the internal of the chamber 5. The path of the gas 40 is indicated by a twisted tube 40. This is similar to the depiction of FIG. 4. It is to be understood that obviously, the gas 40 will fill the entire chamber 5. However, in order to visualise the path of the gas 40 in a better way, said path is depicted as a tube, and this tube will both be curling C1 approximately along a helix path as well as rotating R2 around its own axis, best shown in FIG. 7C. In the following, curling is defined as the tube curling (arrow C1) approximately in the same distance around a centre and rotating (arrow R2) as the tube of gas 40 rotates around its own centre axis.

FIGS. 7A and 7B show the chamber 5 equipped with means 41 for transferring heat, i.e. a heat exchanging means 41. Such heat exchanger 41 may be formed in several ways. The liquid distribution system itself and the nozzles are not shown in FIGS. 7A, 7B and 7B. By providing the wet-scrubber with a heat exchanger 41, the wet-scrubber may be arranged to heating e.g. water for various purposes. If the wet-scrubber is used to clean flue smoke from an energy plant, it may have a vital impact on the total economy of the energy plant to harvest energy at this point. In order to be able to harvest energy which would otherwise have been discharged from the exhaust or chimney a heat exchanging means are installed in the chamber and e.g. used for pre-heating the return water from a district heating system before re-entering the energy plant. Although not shown in FIGS. 7A and 7B, it should be understood that the inner surface of the chamber 5 is always covered by liquid. In FIG. 7B the annular wall 8 is removed but the gas 40 and liquid cones 17 are visualized as if the annular wall was still there i.e. for the sake of visualization the annular wall is made transparent (invisible). Hence, only the gas tube 40 and the liquid cones 17 and the heat exchanging means 41 are visible. Arrows R2 indicate the rotation of gas tube 40. Arrows A2 indicate the direction of the liquid emitted from the nozzles (not shown) i.e. the liquid forming the liquid cones 17. Said liquid sent in the direction of arrows A2 causes the gas tube 40 to rotate according to arrow R2. Hence, when the gas tube 40 passes by a liquid cone 17 it will be subjected to a force from liquid the emitted from nozzles (not shown). It is seen that the gas tube 40 has a path that depends on the position of the liquid cones 17. It should be emphasized that the gas tube 40 is a depiction to visualize the general path of the gas in the chamber and gas will indeed be situated beyond the gas tube 40. It is seen that the gas tube 40 seeks to avoid the liquid cones 17 because it is easier for the gas tube 40 to pass around a liquid cone 17 instead of through the liquid cones 17. However, the alternating path seen in relation to the center axis of the chamber 5 of the may be controlled by the position of the liquid cones 17. Hence, it is possible to cause more turbulence by increasing the coverage of the cross-section of the chamber 5 at the position of the each of the cones 17.

The curling C1 of the smoke tube 40 occurs due to the fact that the smoke constantly seeks the easiest way to pass through the chamber 5 along the longitudinal axis 6. The rotation R2 of the smoke tube 40 is introduced due to the velocity of the liquid sent out by the nozzles. When emitting the liquid from the nozzles, the contact area of each liquid cone drags the gas with it and causes the gas to rotate. As mentioned above, it will be understood that the depiction in FIGS. 7A and 7B of the gas is a schematic depiction of the flow of the gas. In reality the entire chamber 5 is filled with gas, and the depiction of the gas tube 40 is provided in order to visualise the main path through the chamber. However, the gas will almost constantly be in touch with liquid in motion and hence, the gas itself will be kept in motion. It is important to realise that said motion is not only along the central axis of the chamber, but is to a great extent in form of rotation (R2) and general turbulence when the gas tube 40 is forced to come in contact with a liquid cone. Furthermore, when the gas is at the perimeter of the chamber 5, i.e. the inner surface 7 of the annular wall 8, the gas will be kept in motion due to rotating liquid film on the inner surface. Due to this constant motion and changing positions of the gas in the chamber as well as the gas particles in relation to each other, the time in which the gas is in contact with the liquid increases. It is during the contact time between the liquid and the gas that the harmful particles and substances are removed by binding them to the liquid.

If e.g. particular harmful gas is to be cleaned by a wet-scrubber according to the invention, it is possible to increase the amount of liquid in contact with a given volume of gas by reducing the general flow of gas along the longitudinal axis of the chamber 5. This is possible because the flow of gas through the chamber may be adjusted separately from the amount of liquid used. Furthermore, emitting the liquid at higher velocity may cause even higher contact time between the liquid and the gas.

A wet-scrubber arranged with a horizontal longitudinal axis 6 according to the invention is not limited to having the gravity determining the relative movement of the liquid along the longitudinal axis 6 of the chamber and the inner surface 7 of the chamber 5. Hence, it is possible to fully determine the duration of stay of the liquid in the chamber 5. The movement of liquid relative to the inner surface 7 of the chamber 5 is gravity-independent.

In order to control the motion of the gas in the chamber along the longitudinal axis 6 of the chamber even further, an induced draught may be provided (not shown).

The pressure of the liquid may be 1-5 bar or 1.5-4.5 bar or more preferred 2-4 bar. The capacity may be 2-20 liters/min or 5-9 liters/min or 6-8 liters/min. The velocity of the liquid emitted may then be 1-3 m/sec or 1.5-2.5 m/sec. The nozzles may have an aperture with a diameter of 1-4 mm or 1.5-3.5 mm or more preferred 2-3 mm.

FIG. 8A and FIG. 8B show embodiments of wet-scrubbers 1 arranged in an exhaust area 63 e.g. of a large ship. FIG. 8A shows an embodiment of the wet-scrubber 1, where a common chamber, a quench section 50, i.e. a quench manifold, is arranged. The quench manifold 50 may be a chamber 5 comprising heat exchanging means (not shown) or simply a chamber 5 fitted with cooling means. Said quench section 50 has three chambers 5 connected to the annular wall of the quench section 50. The three chambers 5 are connected to a further chamber 5 acting as a gas outlet manifold section 51. The chambers 5 do have the same construction but oriented in a different manner in relation to the quench manifold 50. According to the arrow G1, the gas enters the quench section 50 via the exhaust pipe 52, moves further to the chambers 5, and finally exits out into the surrounding environment through the gas outlet manifold

51. A bypass system or valve 53 is indicated. Such valve 53 is used if maintenance of the wet-scrubber is necessary. In such case, the gas may be sent directly out into the surrounding environment. This construction of the wet-scrubber is extremely compact because it is possible to have multiple chambers 50, 5, 51 oriented in multiple angles to each other.

FIG. 8B shows an embodiment of the wet-scrubber 1 where four chambers 5 are connected by tube sections 54. According to the arrow G1, the gas enters the at the bypass valve 53 and the flow through the wet-scrubber 1 is seen when following the arrows. These tube sections 54 may similar to the chambers 5 be provided with a liquid distribution system for achieving a liquid film on the inner surface of the tube section. However, the overall cost of the wet-scrubber 1 may suggest that the tube sections 54 are made from a different material capable of resisting the aggressive gas and hence the tube sections 54 may be left without liquid on the inner side. If the combined capacity of the chambers 5 is sufficient to remove the desired amount of contamination from the gas being let through them the tube sections 54 do not necessarily need to contribute to the contamination removal process. Hence, the tube sections may be used without liquid typically if a more corrosion or acid resistant material is used. The FIGS. 8A and 8B are shown with liquid exit apertures 19 in various positions. In order to drain the contaminated liquid from the chambers 5 of the wet-scrubber 1 the number and position of the liquid exit aperture 19 may vary. It is seen that the liquid exit apertures 19 are separated from the gas outlet of the whole wet-scrubber 1. Likewise, the liquid exit aperture 19 is separated from the gas outlet of each of the chambers 5.

FIG. 9 shows the wet-scrubber of FIG. 8A placed in a ship or vessel 60. It may emphasise the size of the wet-scrubber and hence the importance of being able to adjust the orientation of the chambers according to the available space. It will be understood from the ship partly shown that the engine 61 of the ship is practically always placed as low as possible and in a direct line with the shaft of the propeller 62. The exhaust area 63 is at the top of the ship, and the wet-scrubber must be positioned in between. If the ship is not initially arranged with a wet-scrubber, it may be practically impossible to fit a scrubber which will only be capable of being arranged in one way. Furthermore, due to the movements of the ship due to the waves, wet-scrubbers relying solely on the gravity force to move the liquid are difficult to use because the resulting force of the gravity changes in relation to the angular position (in relation to sea level) of the entire ship.

Similar to FIG. 9, FIG. 10 shows a ship having a wet-scrubber (that of FIG. 8B) fitted on the exhaust system. In this case, the space for implementing the wet-scrubber is different and a different construction of chambers 5 has been performed, i.e. three horizontally arranged chambers 5 and a chamber arranged in relation to the three in an angle of 45°. Various reasons may occur to why the scrubber should be arranged in the one or the other way. Similar to the previously shown ship implemented wet-scrubber, the system comprises a valve for bypassing the exhaust, e.g. during maintenance.

It will be understood by the person skilled in the art that various combinations of chamber sections 5 are possible.

The invention claimed is:

1. A wet-scrubber for cleaning flue gas, said wet scrubber comprising:
    a first end comprising a first end wall and a second end comprising a second end wall;
    an annular wall extending from the first end and to the second end so as to form a chamber having a longitudinal axis, said annular wall and said end walls each having an inner surface that together form an inner surface of the chamber and an outer surface;
    said chamber comprising a gas inlet opening and a gas outlet opening for emitting the flue gas from the wet-scrubber, said gas inlet opening and said gas outlet opening being in fluid communication and defining a downstream direction from the gas inlet opening to the gas outlet opening;
    a liquid distribution system comprising at least three liquid outlets each comprising a stationary spray nozzle where the spray nozzles each form a cone and combined form at least three cones of liquid for distributing a liquid film on the inner surface of the chamber;
    said liquid outlets arranged to rotate the liquid film on the inner surface of the annular wall relative to the annular wall, and
    a liquid exit aperture arranged in a wall of the chamber characterized in that the second end comprises the gas outlet opening and is separated from the liquid exit aperture, where the at least three cones are positioned at different positions along the longitudinal axis of the chamber where positioning of the cones creates chicanes in order to obstruct the path of the flue gas in a direction parallel to the longitudinal axis of the chamber and creating an unobstructed path of an area where flue gas can easily pass around the liquid cones for the gas along the longitudinal axis of the chamber so that the gas is adapted to firstly pass around the first cone of liquid, subsequently to pass around the second cone and subsequently to pass around the third cone, and where the liquid exit aperture is arranged at the lowest point of the chamber in order to be able to withdraw liquid from the chamber.

2. The wet-scrubber according to claim 1, wherein the liquid outlets causes the liquid on the inner surface of the chamber to rotate in relation to the inner surface.

3. The wet-scrubber according to claim 1, wherein the liquid distribution system comprises a number of extension tubes comprising:
    a first end in fluid communication with a central liquid conduit,
    a second end arranged for emitting liquid, said first end and second end being in fluid communication.

4. The wet-scrubber according to claim 1, wherein the liquid exit aperture comprises at least one liquid exit aperture.

5. The wet-scrubber according to claim 3, wherein the second end of the extension tubes comprises a tube outlet, where an axis of the tube outlet is arranged so as to point towards the inner surface of the chamber in a downstream angle.

6. The wet-scrubber according to claim 1, wherein the longitudinal axis of the chamber is substantially horizontal.

7. The wet-scrubber according to claim 1, wherein the chamber and the longitudinal axis of the chamber are formed in an angle.

8. The wet-scrubber according to claim 1, wherein the liquid distribution system comprises a substantially centrally arranged conduit in fluid communication with the nozzles inside the chamber and a liquid supply.

9. The wet-scrubber according to claim 1, wherein the chamber comprises a heat exchanger arranged to harvest energy from the gas in the chamber.

10. A method of cleaning flue gas, the method comprising the steps:
providing a wet-scrubber comprising a first end comprising a first end wall and a second end comprising a second end wall; an annular wall extending from the first end and to the second end so as to form a chamber having a longitudinal axis, said annular wall and said end walls having an inner surface and an outer surface, said chamber comprising a gas inlet opening and a gas outlet opening for emitting the flue gas from the wet-scrubber, said openings being in fluid communication and defining a downstream direction from the inlet opening to the outlet opening, a liquid distribution system comprising at least three liquid outlets each comprising a stationary spray nozzle, where each of the spray nozzle forms a cone and combined form at least three cones of liquid for distributing a liquid film on the inner surface of the chamber, and where the at least three cones are positioned at different positions along the longitudinal axis of the chamber, a liquid exit aperture arranged at the lowest point of an annular wall of the chamber, where the second end comprises the gas outlet opening and is separated from the liquid exit aperture,
injecting liquid through the liquid distribution system creating the cone of liquid formed from each of the spray nozzles for distributing the liquid film on the inner surface of the chamber where each liquid cone provides an area where flue gas can easily pass around the liquid cones;
rotating the liquid film on the inner surface of the annular wall relative to the inner surface of the chamber using the injected cone of the liquid,
providing contaminated flue gas into the chamber via the inlet opening forcing the gas into contact with the liquid,
providing an unobstructed path for the gas along the longitudinal axis of the chamber where the cones of liquid creates chicanes in order to obstruct the path of the flue gas in a direction parallel to the longitudinal axis of the chamber,
arranging the gas to pass around a first cone of liquid, subsequently to pass around a second cone of liquid, and subsequently to pass around a third cone of liquid, and
emitting the cleaned gas from a gas outlet opening of the chamber.

11. The method of cleaning flue gas according to claim 10, wherein the method further comprises the steps:
spraying liquid into the chamber in a manner so as to partly block a linear path for the gas in the chamber,
causing the gas to follow a spiral path and/or a wiggling path.

12. A method of cleaning flue gas comprising the step of using a wet-scrubber according to claim 1 to clean flue gas.

13. The method of cleaning flue gas according to claim 12 further comprising the step of using a wet-scrubber according to claim 1 to clean exhaust from an engine of a ship, wherein the longitudinal axis of the chamber is substantially parallel with the waterline of the ship.

14. A ship comprising a wet-scrubber according to claim 1 characterized in that the longitudinal axis of the chamber of the wet-scrubber is horizontally positioned.

* * * * *